(12) United States Patent
Hivert et al.

(10) Patent No.: US 10,498,376 B2
(45) Date of Patent: Dec. 3, 2019

(54) STANDARDISED MEASUREMENT METHOD FOR MEASURING THE MODULATION OF AN AMPLITUDE-MODULATED RADIO SIGNAL AND METHOD FOR FILTERING THE RADIO SIGNAL

(71) Applicants: Continental Automotive France, Toulouse (FR); Continental Automotive GmbH, Hannover (DE)

(72) Inventors: Grégoire Hivert, Coulombs (FR); Chao Lin, Maurepas (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/330,473

(22) PCT Filed: Sep. 7, 2017

(86) PCT No.: PCT/FR2017/052380
§ 371 (c)(1),
(2) Date: Mar. 5, 2019

(87) PCT Pub. No.: WO2018/046859
PCT Pub. Date: Mar. 15, 2018

(65) Prior Publication Data
US 2019/0207634 A1    Jul. 4, 2019

(30) Foreign Application Priority Data

Sep. 12, 2016 (FR) ..................... 16 58463

(51) Int. Cl.
*H04B 1/10* (2006.01)
*G10L 25/81* (2013.01)
(Continued)

(52) U.S. Cl.
CPC ............ *H04B 1/1027* (2013.01); *G10L 25/81* (2013.01); *H04B 17/345* (2015.01); *H04L 27/06* (2013.01)

(58) Field of Classification Search
CPC .................................................. H04B 1/1027
(Continued)

(56) References Cited

U.S. PATENT DOCUMENTS

| 4,206,317 | A | 6/1980 | Kahn |
| 6,178,314 | B1 | 1/2001 | Whikehart et al. |
| 6,211,663 | B1 * | 4/2001 | Moulthrop ......... G01R 31/2822 324/615 |

FOREIGN PATENT DOCUMENTS

EP        1315303 A1    5/2003

OTHER PUBLICATIONS

International Search Report and Written Opinion for International Application No. PCT/FR2017/052380, dated Nov. 21, 2017—9 pages.

(Continued)

*Primary Examiner* — Lihong Yu
(74) *Attorney, Agent, or Firm* — RatnerPrestia

(57) ABSTRACT

A method for filtering an amplitude-modulated radio signal, the radio signal having a bandwidth, the method including: transforming the radio signal into baseband, determining a frequency range close to the center frequency, measuring the level of the radio signal, by frequency steps, in the frequency range, determining a standardized modulation level in the radio signal, corresponding to the sum of the level measurements by frequency steps, in the frequency range under consideration, divided by the measurement of the level of the radio signal in baseband calculated around the center frequency, comparing the standardized noise level thus determined with a predetermined threshold, on the basis of (Continued)

the comparison, choosing a first filter applied to the amplitude-modulated radio signal.

9 Claims, 2 Drawing Sheets

(51) Int. Cl.
  *H04L 27/06*   (2006.01)
  *H04B 17/345*   (2015.01)
(58) Field of Classification Search
  USPC ........................................................ 375/262
  See application file for complete search history.

(56) References Cited

OTHER PUBLICATIONS

International Search Report and Written Opinion for International Application No. PCT/FR2017/052377, dated Nov. 21, 2017—8 pages.

\* cited by examiner

STANDARDISED MEASUREMENT METHOD FOR MEASURING THE MODULATION OF AN AMPLITUDE-MODULATED RADIO SIGNAL AND METHOD FOR FILTERING THE RADIO SIGNAL

CROSS REFERENCE TO RELATED APPLICATIONS

This application is the U.S. National Phase application of PCT International Application No. PCT/FR2017/052380, filed Sep. 7, 2017, which claims priority to French Patent Application No. 1658463, filed Sep. 12, 2016, the contents of such applications being incorporated by reference herein.

FIELD OF THE INVENTION

The invention relates to the field of limiting noise in a radio signal, more precisely in an amplitude-modulated radio signal, in particular intended to be implemented in radio receivers on board motor vehicles.

In this context, an aspect of the present invention targets a method for determining a standardized modulation level in an amplitude-modulated radio signal, in particular in order to determine whether the radio signal under consideration contains an audio signal corresponding to voice, and a method for filtering the amplitude-modulated radio signal by implementing dynamic selectivity.

BACKGROUND OF THE INVENTION

As is known, a radio receiver, in particular in a multimedia system of a motor vehicle, is able to receive a radio signal, in particular an AM radio signal, AM being the abbreviation for "amplitude modulation".

Such an AM radio signal, received in modulated form by a radio receiver, is subjected to various sensors and to matched filtering so that the corresponding demodulated radio signal is able to be played back in good conditions, in particular in the passenger compartment of a motor vehicle.

A person skilled in the art is aware of the operating principle of an AM radio signal, that is to say an amplitude-modulated radio signal, received by a suitable radio receiver, for the purpose of being demodulated and then played back to listeners.

An AM radio signal thus contains a carrier p(t) of the signal, having a frequency $f_p$, satisfying the equation:

$$p(t)=A \cdot \sin(2 \cdot \pi \cdot f_p)$$

and a message m(t) to be transmitted satisfying the equation:

$$m(t)=M \cdot \cos(2 \cdot \pi \cdot f_m \cdot t + \varphi)$$

The corresponding modulated signal y(t) then satisfies the equation:

$y(t)=[1+m(t)]*p(t)$, that is to say:

$$y(t) = A \cdot \sin(2 \cdot \pi \cdot f_p \cdot t) + \frac{A \cdot M}{2} \cdot [\sin(2 \cdot \pi \cdot (f_p + f_m) + \varphi) + \sin(2 \cdot \pi \cdot (f_p - f_m) + \varphi)]$$

From a spectral point of view, starting from a message m(t) formed of a plurality of frequencies, the amplitude of the Fourier transform FFT of the modulated signal y(t) containing the message m(t), as a function of frequency. F, is shown in FIG. 1.

To demodulate the AM radio signal, the latter is returned to baseband, such that the message m(t) is centered around 0 Hz, as shown in FIG. 2.

One known problem lies in the fact that the AM radio signal may contain a message m(t) corresponding to voice or corresponding to more complex audio content, such as music.

As is known, an audio signal of "voice" type is scarcely modulated and has a very narrow useful bandwidth. By contrast, an audio signal of "music" type exhibits high modulation and has a wide useful bandwidth.

Now, in practice, amplitude-modulated radio signals often contain audio signals of "voice" type.

One drawback of known amplitude-modulated radio signal filtering techniques lies in the fact that the audio signals of voice type are insufficiently filtered. Specifically, in an AM radio signal transmitting the voice of the speaker during a telephone conversation for example, when the speaker stops talking, the only thing remaining in the AM radio signal is the noise that it contains. This noise is not filtered because the filters applied in the prior art essentially relate to high frequencies.

SUMMARY OF THE INVENTION

According to an aspect of the present invention, there is therefore provision to perform specific filtering of the received AM radio signal before demodulating it, using a dynamic selectivity technique, in order to deal with cases where there is no longer modulation of the signal, which are generally encountered in a signal of "voice" type.

In particular, an aspect of the present invention proposes a method for performing a standardized measurement of the modulation at low frequency, that is to say close to the center frequency of the amplitude-modulated radio signal, in baseband, so as to make it possible to determine whether said radio signal comprises a message consisting of voice or of a more complex audio signal, such as music, or else whether the radio signal does not comprise a message, in the absence of modulation.

An aspect of the present invention also targets a method for filtering the AM radio signal, allowing optimized filtering of said radio signal, before it is demodulated, as a function of the standardized modulation level determined in accordance with the method outlined above.

If the modulation is low, a very narrow filter is therefore used so as to avoid the filtered radio signal containing a background noise that is played back to the listener when the speaker stops talking, during a telephone conversation for example.

To this end, more precisely, one aspect of the present invention is a method for measuring a standardized modulation level in an amplitude-modulated radio signal, said radio signal having a bandwidth and a carrier, said method comprising:

transforming said radio signal into baseband, such that the representation of the Fourier transform of said radio signal as a function of frequency has a bandwidth centered on a center frequency equal to 0 Hz, determining a frequency range close to the center frequency, measuring the level of the radio signal, by frequency steps, in said frequency range, determining a standardized modulation level in the radio signal, corresponding to the sum of the level measurements by frequency steps, in the frequency range under consideration, divided by the measurement of the level of the radio signal in baseband calculated around the center frequency equal to 0 Hz, corresponding to the level of the carrier of the amplitude-modulated radio signal.

The method according to an aspect of the invention thus makes it possible to determine a standardized modulation level in an amplitude-modulated radio signal, before it is demodulated.

According to one embodiment, the frequency range is between 200 Hz and 1.5 kHz.

An aspect of the present invention also targets a method for filtering an amplitude-modulated radio signal, comprising implementing the method for measuring a standardized modulation level in an amplitude-modulated radio signal as briefly described above, and furthermore comprising:

comparing the standardized modulation level thus determined with a predetermined threshold, on the basis of said comparison, choosing a first filter applied to the amplitude-modulated radio signal.

By virtue of an aspect of the present invention, it is therefore possible to implement dynamic selectivity on an amplitude-modulated radio signal, before it is demodulated, so as to filter the noise out of it in an improved manner when said radio signal contains an audio signal of "voice" type.

According to one embodiment, the filtering method moreover comprises selecting a second filter, symmetrical to the first filter about the center frequency of the amplitude-modulated radio signal transformed into baseband, applied to said amplitude-modulated radio signal.

According to one embodiment, the amplitude-modulated radio signal comprises a message consisting of an audio signal formed of a human voice.

Advantageously, the first filter is chosen in real time so as to ensure dynamic selectivity in the amplitude-modulated radio signal.

According to one embodiment, the first filter is a finite impulse response filter.

An aspect of the present invention also targets a modulation sensor configured so as to measure levels in an amplitude-modulated radio signal, by frequency steps, in a frequency range, and so as to determine a standardized modulation level of the radio signal in said frequency range, said standardized modulation level corresponding to the sum of the level measurements by frequency steps, in said frequency range, divided by the measurement of the level of the radio signal in baseband around the center frequency equal to 0 Hz, so as to implement the method for measuring a standardized modulation level as briefly described above.

An aspect of the present invention also targets a radio receiver comprising a modulation sensor as briefly described above.

An aspect of the present invention also targets a motor vehicle comprising a radio receiver as briefly described above.

BRIEF DESCRIPTIONS OF THE DRAWINGS

Aspects of the invention will be better understood upon reading the following description, given solely by way of example, and with reference to the appended drawings, in which.

It should be noted that the figures set forth aspects of the invention in a detailed manner so as to enable the implementation thereof, said figures also being able to serve to better define aspects of the invention, of course.

DETAILED DESCRIPTION OF THE PREFERRED EMBODIMENTS

The method for determining a standardized modulation level in an AM radio signal and the corresponding filtering method, according to an aspect of the invention, are presented primarily for the purpose of implementation in a radio receiver of a multimedia system on board a motor vehicle.

However, the implementation of an aspect of the present invention in any other technical field, in particular in any type of AM radio receiver, is also targeted.

In the remainder of the description, an aspect of the present invention is presented in relation to the reception of an AM radio signal, received by an AM radio receiver, for example on board a vehicle, in the context of a set of frequency bands dedicated to these signals and organized in accordance with local standards.

As is known, the width of the spectrum of an amplitude-modulated radio signal is standardized, at 9 kHz for Europe and at 10 kHz in North America, for example.

In Europe, the bandwidth of the corresponding audio signal is normally 4.5 kHz in practice. However, some transmitters have widened bandwidths with bandwidths possibly of up to 9 kHz.

In the context of an aspect of the present invention, by way of a level sensor in the modulated AM radio signal, returned to baseband, it is useful to focus on low frequencies, close to the center frequency (that is to say 0 Hz in the representation of the AM radio signal in baseband), in order to evaluate the modulation of said signal in a frequency range close to said center frequency.

Figure 1:
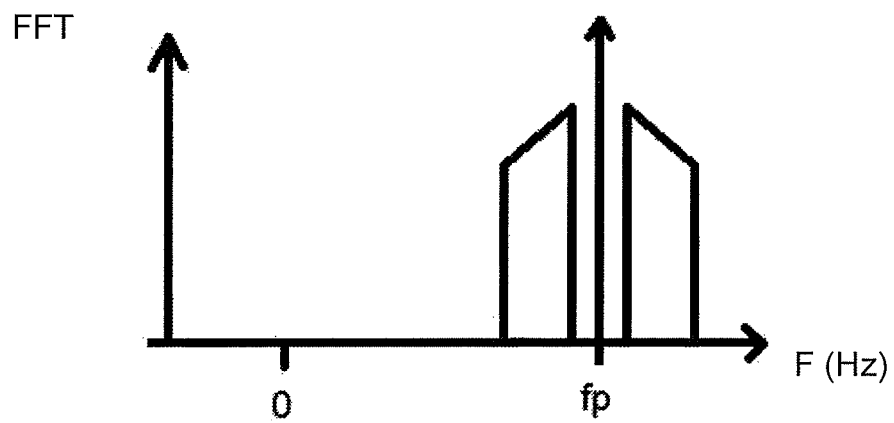
FIG. 1 shows the simplified diagram of a Fourier transform FFT of an amplitude-modulated signal as a function of frequency.
Figure 2:
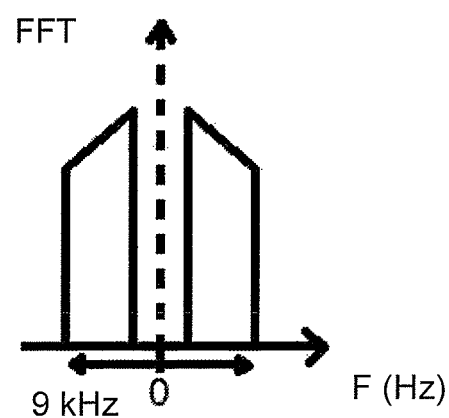
FIG. 2 shows the simplified diagram of such a Fourier transform of an amplitude-modulated signal, returned to baseband.
Figure 3:
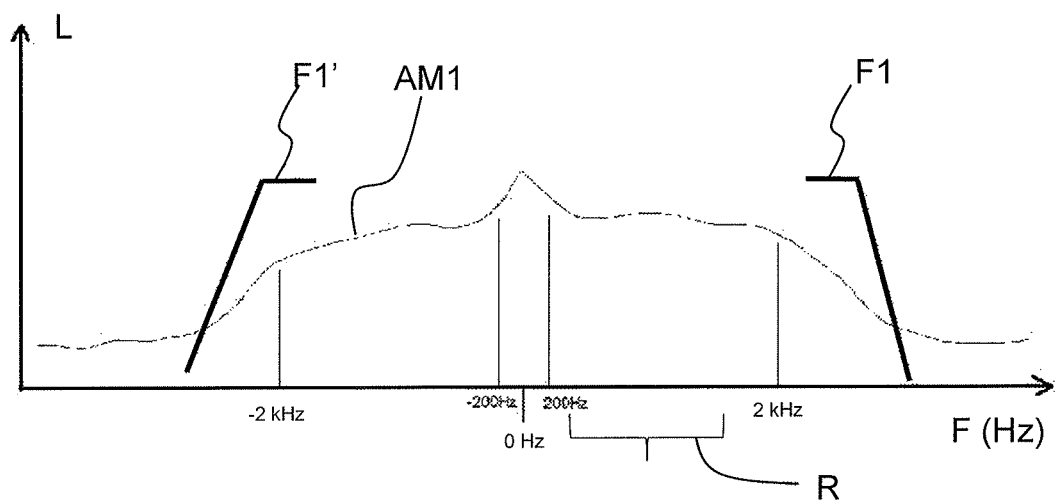
FIG. 3 shows the graph of the level L of an amplitude-modulated radio signal as a function of frequency, returned to baseband, said radio signal comprising a message consisting of an audio signal formed of music.
Figure 4:
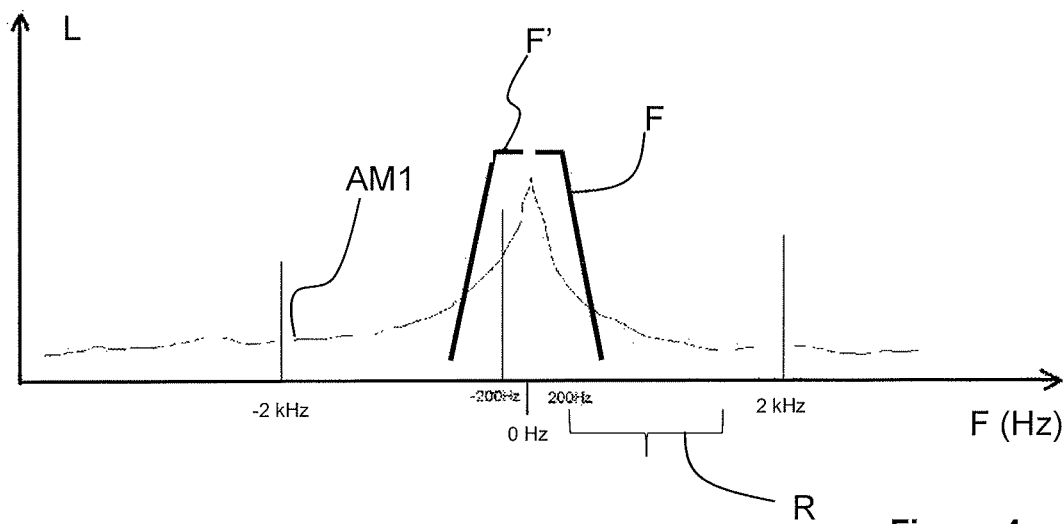
FIG. 4 shows the graph of the level L of an amplitude-modulated radio signal as a function of frequency, returned to baseband, said radio signal comprising a message consisting of an audio signal formed of voice.

The aim is to determine whether the audio message contained in the radio signal AM1 has a narrow useful bandwidth, as in FIG. 4, which would be characteristic of an audio signal of "voice" type, or at least of the absence of modulation in the radio signal, or a wide useful bandwidth, as in FIG. 3, which would be the sign of an audio signal of "music" type.

In the presence of an audio signal of "music" type, as in FIG. 3, wide filters F1, F1' are used.

By contrast, in the presence of an audio signal of "voice" type, as in FIG. 4, which is scarcely modulated in the frequency range R under consideration, close to the center frequency, narrow filters F, F' may be selected and applied to the radio signal AM1, in accordance with an aspect of the present invention.

The frequency range in which the modulation level is evaluated, according to an aspect of the invention, is narrow and situated close to the center frequency. In practice, for example, the frequency range of 200 Hz-1.5 kHz is analyzed.

It should be noted that fine adjustment of the frequency range over which the level of the radio signal AM1 has to be measured is preferably performed, in the context of implementing the filtering method according to an aspect of the invention, according to the particular case.

With reference to FIGS. 3 and 4, the method for determining a standardized modulation level according to an aspect of the invention therefore provides for measuring the level of the radio signal AM1 transformed into baseband, by frequency steps, in the frequency range R under consideration, close to the center frequency of said radio signal AM1.

According to an aspect of the invention, a level sensor is thus configured so as to measure the level of the radio signal AM1, by frequency steps, in a predetermined frequency range R situated close to the center frequency of the radio signal AM1.

Typically, the frequency range R of between 200 Hz and 1.5 kHz, or even between 200 Hz and 2 kHz, over the radio signal AM1 transformed into baseband centered on 0 Hz, may be chosen.

It should be noted that the frequency range R in which the level of the radio signal is measured is preferably adjusted, in particular by virtue of the presence of a controller, so as to take into account physical characteristics of the radio signal AM1 that is effectively received.

Likewise, the number of measurement points of the level of the radio signal AM1 may be adjusted. Typically, according to one embodiment given by way of nonlimiting illustration, 16 measurements of the level of the radio signal AM1 are performed in the frequency range R ranging from 200 Hz to 1.5 kHz, or even from 200 Hz to 2 kHz, outlined above.

With reference to FIGS. 3 and 4, according to an aspect of the invention, a plurality of level measurements is therefore performed, by frequency steps, in the predetermined frequency range R. These level measurements are summed, and the result of this sum is divided by the measurement of the level of the radio signal AM1 transformed into baseband around the center frequency equal to 0 Hz, corresponding to the level of the carrier of the radio signal AM1. The result of this division constitutes a standardized measurement of the modulation level in the radio signal AM1.

With continuing reference to FIGS. 3 and 4, according to an aspect of the invention, the standardized modulation level is compared with a predefined threshold so as to make it possible to choose filters F1, F1', respectively F, F', to be applied to the radio signal AM1, before it is demodulated.

The chosen filter is typically selected from among a plurality of available filters in the system incorporating the radio receiver under consideration. According to one embodiment, the system comprises three filters F, F1 at the top of the bandwidth and three filters F', F1' at the bottom of the bandwidth. According to one embodiment, the selected filter(s) is (are) a finite impulse response filter(s), often denoted using the abbreviation FIR by a person skilled in the art.

In this case, on each side of the bandwidth, there is typically a wide filter at 5 kHz, a filter F1, F1' at 3 kHz, respectively −3 kHz, and a filter F, F' at 1 kHz, respectively −1 kHz.

According to an aspect of the invention, the predetermined threshold is configured such that, if the standardized modulation level calculated in the frequency range under consideration is lower than the predetermined threshold, this means that the radio signal AM1 contains an audio signal of "voice" type or that the radio signal AM1, in the absence of significant modulation, does not contain any relevant information in the frequency range under consideration. Therefore, as shown in FIG. 4, the filter F that is selected is narrow. The same applies for the second filter F', which is symmetrical to the filter F about the center frequency and also preferably applied to the amplitude-modulated radio signal AM1.

According to an aspect of the invention, selecting the filter(s) to be used in real-time, on the basis of the standardized modulation level in the signal, makes it possible to implement optimum dynamic selectivity in the received radio signal AM1, before it is demodulated.

It is specified, furthermore, that aspect of the present invention are not limited to the embodiment described above and is open to variants accessible to a person skilled in the art.

The invention claimed is:

1. A method for filtering an amplitude-modulated radio signal, comprising implementing a method for measuring a standardized modulation level in an amplitude-modulated radio signal, said amplitude-modulated radio signal having a bandwidth and a carrier, said measurement method comprising:
   transforming said amplitude-modulated radio signal into baseband, such that the representation of a Fourier transform of said radio signal as a function of frequency has a bandwidth centered on a center frequency equal to 0 Hz,
   determining a frequency range between 200 Hz and 1.5 kHz,
   measuring a level of the amplitude-modulated radio signal, by frequency steps, in said frequency range,
   determining a standardized modulation level in the amplitude-modulated radio signal, corresponding to a sum of the level measurements by frequency steps, in the frequency range under consideration, divided by the measurement of the level of the amplitude-modulated radio signal in baseband calculated around the center frequency equal to 0 Hz, corresponding to the level of the carrier of the amplitude-modulated radio signal,
   said filtering method moreover comprising:
   comparing the standardized modulation level thus determined with a predetermined threshold,
   on the basis of said comparison, selecting a first filter applied to the amplitude-modulated radio signal.

2. The method for filtering an amplitude-modulated radio signal as claimed in claim 1, moreover comprising selecting a second filter, symmetrical to the first filter about the center frequency of the amplitude-modulated radio signal transformed into baseband, applied to said amplitude-modulated radio signal.

3. The method for filtering an amplitude-modulated radio signal as claimed in claim 1, wherein the amplitude-modulated radio signal comprises a message consisting of an audio signal formed of a human voice.

4. The method for filtering an amplitude-modulated radio signal as claimed in claim 1, wherein the first filter is chosen in real time so as to ensure dynamic selectivity in the amplitude-modulated radio signal.

5. The method for filtering an amplitude-modulated radio signal as claimed in claim 1, wherein the first filter is a finite impulse response filter.

6. A modulation sensor configured so as to measure levels in an amplitude-modulated radio signal, by frequency steps, in a frequency range, and so as to determine a standardized modulation level of the radio signal in said frequency range, said standardized modulation level corresponding to a sum of the level measurements by frequency steps, in said frequency range, divided by a measurement of the level of the radio signal in baseband around the center frequency equal to 0 Hz, so as to implement the method for measuring a standardized modulation level as claimed in claim 1.

7. A radio receiver comprising a modulation level sensor as claimed in claim 6.

8. A motor vehicle comprising a radio receiver as claimed in claim 7.

9. The method for filtering an amplitude-modulated radio signal as claimed in claim 2, wherein the amplitude-modulated radio signal comprises a message consisting of an audio signal formed of a human voice.

\* \* \* \* \*